(12) United States Patent
Laskey et al.

(10) Patent No.: US 7,214,135 B2
(45) Date of Patent: May 8, 2007

(54) DRIVE SHAFT HAVING A DAMPER INSERT

(75) Inventors: Ryan W. Laskey, Toledo, OH (US);
John L. Hickey, Maumee, OH (US);
Kevin E. Niebel, Toledo, OH (US)

(73) Assignee: Torque-Traction Technologies, LLC, Maumee, OH (US)

( * ) Notice: Subject to any disclaimer, the term of this patent is extended or adjusted under 35 U.S.C. 154(b) by 107 days.

(21) Appl. No.: 10/652,880

(22) Filed: Aug. 29, 2003

(65) Prior Publication Data

US 2005/0049054 A1 Mar. 3, 2005

(51) Int. Cl.
*F16C 3/00* (2006.01)

(52) U.S. Cl. .................... 464/180; 464/181

(58) Field of Classification Search .......... 464/52, 464/180, 181, 183; 138/129, 154, 173; 181/196, 181/207, 208
See application file for complete search history.

(56) References Cited

U.S. PATENT DOCUMENTS

| | | | |
|---|---|---|---|
| 2,751,765 A | | 6/1956 | Rowland et al. |
| 3,389,579 A | * | 6/1968 | Johannes et al. ............. 464/52 |
| 3,837,364 A | * | 9/1974 | Jenner |
| 4,014,184 A | | 3/1977 | Stark |
| 4,037,626 A | * | 7/1977 | Roberts, Jr. |
| 4,124,928 A | | 11/1978 | Stark |
| 4,487,232 A | * | 12/1984 | Kanao .................... 138/173 X |
| 4,909,361 A | | 3/1990 | Stark et al. |
| 4,915,425 A | * | 4/1990 | Hegler et al. ........... 138/173 X |
| 5,071,173 A | * | 12/1991 | Hegler et al. |
| 5,976,021 A | | 11/1999 | Stark et al. |
| 6,367,510 B1 | * | 4/2002 | Carlson .................. 138/129 X |
| 6,370,756 B1 | | 4/2002 | Conger et al. |
| 6,527,644 B2 | | 3/2003 | Glowacki et al. |
| 6,691,743 B2 | * | 2/2004 | Espinasse ............... 138/129 X |

FOREIGN PATENT DOCUMENTS

EP   001154184 A1 * 11/2001

OTHER PUBLICATIONS

Dana Drawing No. 232508, dated Apr. 24, 1992.
Dana Drawing No. 232508, dated Apr. 24, 1992.

* cited by examiner

*Primary Examiner*—Greg Binda
(74) *Attorney, Agent, or Firm*—MacMillan, Sobanski & Todd, LLC

(57) ABSTRACT

A damper insert for assembly in a tubular drive shaft of a motor vehicle includes a tubular sleeve, a helically wound, resiliently deformable wiper secured to the sleeve, and a corrugated winding secured to the sleeve. The wiper includes an arch that spans mutually spaced supports. The damper insert is sized to fit in the bore of the drive shaft such that the arch frictionally engages the surface of the bore and secures the insert in place within the shaft with a resilient press fit. The arch projects radially outward toward the bore beyond the radially outer surface of the winding.

19 Claims, 2 Drawing Sheets

DRIVE SHAFT HAVING A DAMPER INSERT

BACKGROUND OF THE INVENTION

The invention relates to a drive shaft assembly for transmitting power in a motor vehicle. In particular, the invention relates to a damper insert located in a tubular drive shaft to attenuate vibration and noise.

Drive train systems are widely used for transmitting power from a rotating source to a rotatably driven mechanism. For example, in motor vehicles, an engine/transmission assembly generates rotational power, which is transmitted from an output shaft of the engine/transmission assembly through a drive shaft assembly to an input shaft of an axle assembly that drives the wheels of the vehicle. To accomplish this, a typical drive shaft assembly includes a hollow cylindrical drive shaft tube having a pair of end fittings, such as a pair of tube yokes, secured to the front and rear ends of the tube. The front-end fitting forms a portion of a front universal joint that connects the output shaft of the engine/transmission assembly to the front end of the drive shaft tube. Similarly, the rear end fitting forms a portion of a rear universal joint that connects the rear end of the drive shaft tube to the input shaft of the axle assembly. The front and rear universal joints provide a rotational driving connection from the output shaft of the engine/transmission assembly through the drive shaft tube to the input shaft of the axle assembly.

It is common for a drive shaft assembly to be subjected to vibration from multiple sources while in service. It is desirable to damp such vibrations to reduce noise and vibration in the vehicle. Any mechanical body has a natural resonant frequency, which is an inherent characteristic of the body, its composition, size, and shape. The resonant frequency is comprises many sub-frequencies, often referred to as harmonics. As the rotational speed of a hollow article changes, it may pass through the harmonic components of its resonant frequency. When the rotational velocity of the article passes through these harmonic frequencies, vibration and noise may be amplified because the two frequencies are synchronized, and the rotational energy of the article is undesirably converted into vibration and noise.

A variety of techniques and devices are known for damping the undesirable noise that can be produced by hollow articles during rotation. For example, in a drive shaft assembly, a cylindrical cardboard insert is disposed within a tubular drive shaft to dampen the noise generated during use. In many instances, the outer surface of the cardboard insert is provided with a solid bead of an elastomeric material that extends helically along the length of the tube. The solid helical bead is provided to engage the inner surface of the tube with an elastically developed force to prevent the damper insert from moving relative to the tube in service. As the tube transmits power, it can experience changes in its shape because of torsional and flexural loads. It has been found that engagement of the solid helical bead with the inner surface of the tube causes the insert to change its shape with the hollow article. As a result of this change of shape, the resonant frequency of the cardboard insert changes also, resulting in an undesirable reduction in its ability to dampen noise and vibration.

In addition, the preload force developed in the solid helical bead due to contact with the inner surface of the tube compresses the bead and impairs its ability to deform elastically with the tube. Changes in humidity cause expansion and contraction of the paper insert, which affects the radial space between the damper insert and the inner surface of the tube. The tube itself has variations in its wall thickness and variations in its circularity. These also influence the size of the radial space between the damper insert and the inner surface of the tube.

Although such damper inserts have performed reasonably well in absorbing drive shaft vibrations, they have a tendency to creep relative to the drive shaft due to the repetitive application and release of torsional and flexural displacement. Changes in temperature and humidity cause variations in the ability of the insert to resist vibration-induced deformation of the drive shaft cross section.

SUMMARY OF THE INVENTION

To address these deficiencies, the solid bead of the prior art damper insert is replaced by a helical wiper having a convex outer surface. The helical wiper includes a base portion that is secured to the cardboard insert and a flexible arch portion that engages the inner surface of a tubular shaft. The base portion and the arch portion define a hollow interior portion. If desired, an outwardly extending nib can be formed in the flexible arch portion of the helical wiper. When the tube experiences changes in its physical shape in service, the material in the relatively flexible arch portion of the helical wiper deflects elastically to prevent the shape of the cardboard insert from changing. Consequently, the noise and vibration dampening characteristics of the cardboard insert remain essentially unchanged.

A noise and vibration damper insert according to this invention is intended for use with a tubular cylinder having an inner surface. The damper includes a tube having an outer surface sized to fit within the cylinder. A wiper is wound in a helical path on the outer surface, providing spaces on the outer surface between successive passes of the helical path. The wiper including a base secured to the tube, mutually spaced supports extending radially outward from the base, and an arch formed of an elastically deformable material, spanning a cavity between the supports and projecting radially outward from the outer surface. A corrugated winding, located in the spaces on the outer surface, is formed with undulating crests and valleys, the crests having a radial height extending from the outer surface such that the arch extends radially beyond the height of the crests and into loaded contact with the inner surface of the cylinder. This preloaded contact deforms the arch and secures the damper insert to the cylinder.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
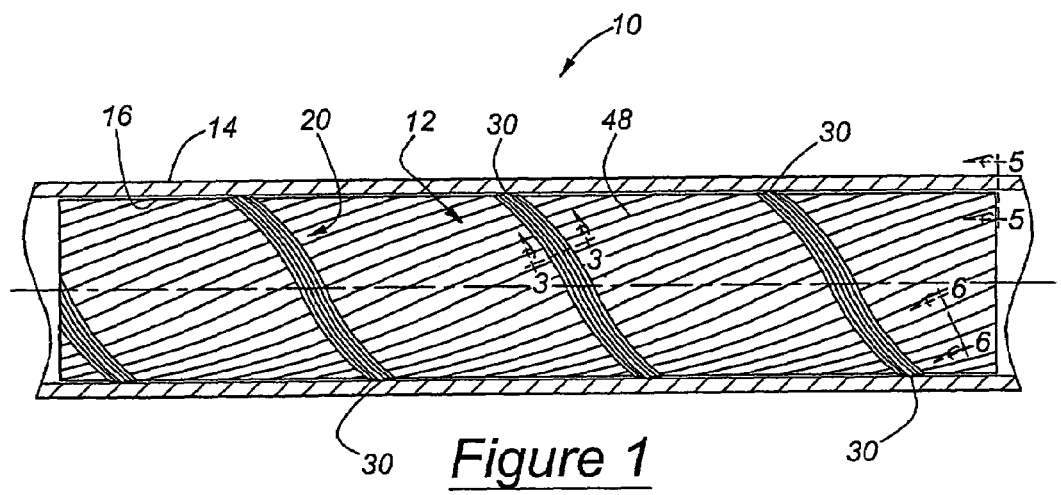
FIG. 1 is a view of a drive shaft tube assembly with a damper installed, the tube shown in cross section along its longitudinal axis, the damper shown in side elevation.
Figure 2:
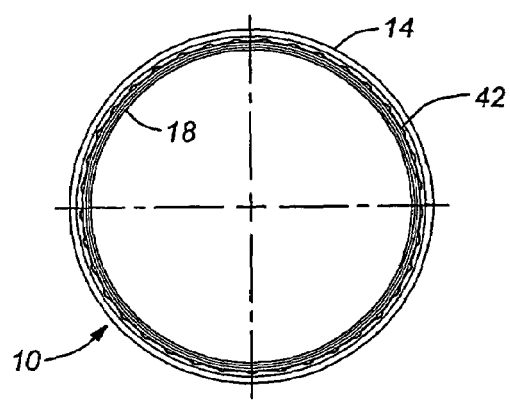
FIG. 2 is a side elevation view of the assembly of FIG. 2.

Referring now to the drawings, a drive shaft assembly 10 according to this invention includes a tubular damper insert 12 adapted for use in a cylindrical, tubular drive shaft 14, which transmits rotating power in a motor vehicle drive train between the vehicle's power source, such as an engine or electric motor, and its driven wheels. The shaft has a circular cylindrical bore 16.

The insert 12 includes a circular cylindrical tubular core 18 formed of a suitable number of plies of paperboard or other fibrous material, preferably three or four plies of BOGUS-Kraft recycled paperboard. A wiper 20, helically wound on the outer surface of the core 18, is secured to the core by a thin coating of adhesive. The wiper is wound on the core with an approximate 30-degree helix angle with respect to a transverse plane. Preferably, the wiper is an extrusion of EPDM rubber having a Shore hardness in the range 50–60, or an extrusion of an elastic substance having physical properties resembling those of rubber, such as elastomer.

Figure 3:
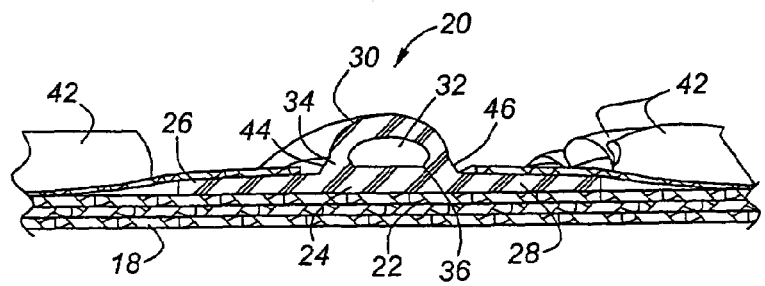
FIG. 3 is an enlarged cross section taken at plane 3—3 of FIG. 1.
Figure 4:
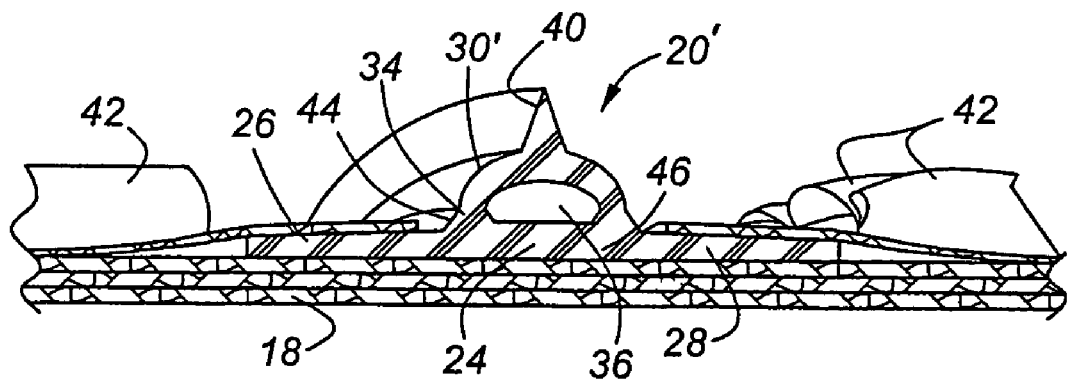
FIG. 4 is cross section of an alternate wiper taken at plane 3—3 of FIG. 1.
Figure 5:
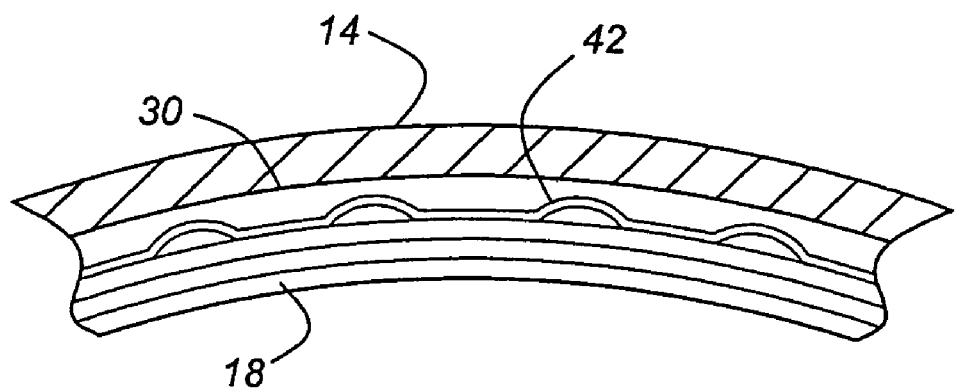
FIG. 5 is an enlarged cross section taken at plane 5—5 of FIG. 1.

The wiper 20 includes a flat base 22, a thick central region 24, and two flanges 26, 28 extending in opposite lateral directions from the central region 24, when viewed as in FIGS. 3 and 4. The central region 24 is formed with an arch 30 extending along the length of the wiper 20 and spanning a hollow, enclosed, and unfilled cavity 32 located between mutually spaced supports 34, 36, which extend radially outward from the thickened region 24 of the base 22. Preferably, the outer contour of the arch 30 is convex. In service, the arch 30 of the wiper 20 flexes and deforms elastically with the drive shaft tube 14 due to its pre loaded contact with the drive shaft tube 14, the elastic nature of the wiper's material, and the flexibility provided by the thin wall of the arch 30 that spans the supports 34, 36. The ability of the arch 30 to flex and deform with the drive shaft tube 14 more effectively dampens noise transmitted by the assembly 10 than if the wiper 20 were a solid projection extending from the outer surface of the core 18 to the inner surface of the drive shaft tube 14.

The cross section of an alternate form of the arch 30' of an alternate wiper 20' is shown in FIG. 4. Extending along the length of the arch 30' and located between the supports 34, 36, at or near the center of the span between the supports 34, 36, is a radially directed projection or nib 40 of elastomer formed integrally with the arch 30' of the alternate wiper 20'. The nib 40 increases the preload or pressout force required to move the core 12 relative to the tube 14.

When securing the wiper 20 to the core 18, the wiper preferably is maintained under uniform tension to ensure that it has a uniform width and height as installed. The adhesive used to bond the wiper 20 to the core 18 is applied to the flat base 22 of the wiper, and should be impervious to moisture and capable of bonding the wiper securely to the core.

After bonding the wiper 20 to the core 18, a winding of corrugated paper 42 is helically wound around the surface of the core and located in the helical spaces between adjacent passes of the wiper around the outer surface of the core. The winding 42 is bonded by adhesive to the core 18. The corrugated paper 42 is preferably "B" flute paper, single face, and wound in a helix such that the corrugations are exposed at the outer surface of the damper insert 12. The corrugated paper winding 42 overlaps the lateral flanges 26, 28 of the wiper 20. While the applying the corrugated paper winding 42 to the core 18 and helically winding it on the core, the lateral edges 44, 46 of the supports 34, 36 guide the edges of the winding 42 into their proper position on the core 18.

Figure 6:
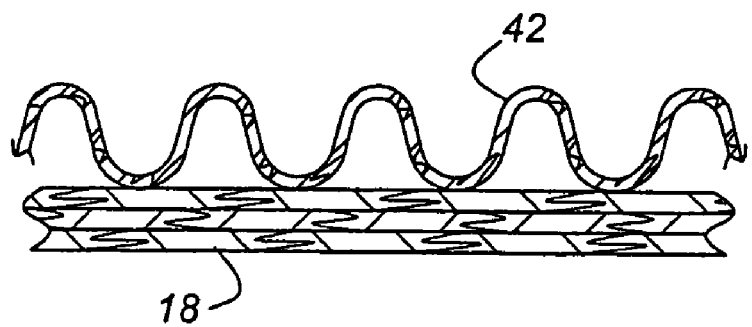
FIG. 6 is a cross section taken at plane 6—6 of FIG. 1 showing the corrugated winding and tube in a horizontal plane.

Overlapping of the lateral flanges 26, 28 of the wiper 20 with the corrugated paper winding 42 reinforces the bond of the wiper 20 to the core 18. The crests and valleys 48 of the corrugations of the winding 42 extend between each spiral loop of the wiper, as shown in FIG. 1. The corrugations have an arcuate, semi-circular form when viewed in cross section, as shown in FIG. 6.

The outside diameter of the corrugated paper winding 42 of the damper insert 12 corresponds substantially to the diameter of the bore 16 of the drive shaft tube 14. The arch 30 projects radially beyond the outer surface of the crests of winding 42 enough to produce a suitable resilient, preloaded press fit of the arch 30 with the inner surface of the drive shaft at its bore 16. This elastic preload resulting from the interference fit of the arch 30 on the tube 14 produces frictional engagement between the wiper 20 and the surface of the bore 16 sufficient to retain of the damper insert 12 at the desired axial location in the drive shaft tube 14.

The nib 40 located on the arch 30' similarly projects beyond the radially outer surface of the winding 42 to produce a suitable resilient, preloaded press fit of the nib on the inner surface of the drive shaft tube 14. The elastic support provide by arch 30' to nib 40 reduces the magnitude of compressive force that is developed in the nib 40 due to the preload as compared to the magnitude of force that would be developed if the nib 40 extended to the base 22 of the wiper 20. Similarly the elastic preload resulting from the interference fit of the nib 40 on the drive shaft tube 14 produces frictional engagement between the wiper 20 and the surface of the bore 16 sufficient to retain of the damper insert 12 at the desired axial location in the drive shaft tube 14.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An assembly of a hollow member and a damper insert comprising:
   a hollow member having an inner surface; and
   a damper insert disposed within said hollow member and including a core having an outer surface and a wiper extending about said outer surface of said core that engages said inner surface of said hollow member, said wiper having a hollow, enclosed cavity provided therein that defines an arch, said arch being elastically deformed when said damper insert is disposed within said hollow member, said wiper including a base having first and second flanges that extend in opposite directions from said base and a winding of corrugated paper that extends about said core and overlaps said first and second flanges.

2. The assembly defined in claim 1 wherein said hollow member is a drive shaft tube.

3. The assembly defined in claim 1 wherein said wiper extends helically about said outer surface of said core.

4. The assembly defined in claim 1 further including a nib that projects from said arch into engagement with said inner surface of the hollow member.

5. The assembly defined in claim 1 wherein said arch extends between a pair of supports.

6. The assembly defined in claim 5 further including a nib that projects from said arch into engagement with said inner surface of the hollow member.

7. An assembly of a hollow member and a damper insert comprising:
   a hollow member having an inner surface; and
   a damper insert disposed within said hollow member and including a core having an outer surface and a wiper extending about said outer surface of said core that engages said inner surface of said hollow member, said wiper having a hollow, enclosed cavity provided therein that defines an arch, said arch being formed from an elastically deformable material, said wiper including a base having first and second flanges that extend in opposite directions from said base and a winding of corrugated paper that extends about said core and overlaps said first and second flanges.

8. The assembly defined in claim 7 wherein said hollow member is a drive shaft tube.

9. The assembly defined in claim 7 wherein said wiper extends helically about said outer surface of said core.

10. The assembly defined in claim 7 further including a nib that projects from said arch into engagement with said inner surface of the hollow member.

11. The assembly defined in claim 7 wherein said arch extends between a pair of supports.

12. The assembly defined in claim 11 further including a nib that projects from said arch into engagement with said inner surface of the hollow member.

13. A drive train system comprising:
   a source of rotational power;
   a rotatably driven mechanism; and
   a drive shaft assembly connecting said source of rotational power and said rotatably driven mechanism, said drive shaft assembly including a hollow drive shaft tube having an inner surface; and a damper insert disposed within said hollow drive shaft tube, said damper insert including a core having an outer surface and a wiper extending about said outer surface of said core that engages said inner surface of said hollow drive shaft tube, said wiper having a hollow, enclosed cavity provided therein that defines an arch, said arch being elastically deformed when said damper insert is disposed within said hollow drive shaft tube.

14. The drive train system defined in claim 13 wherein said wiper extends helically about said outer surface of said core.

15. The drive train system defined in claim 13 further including a nib that projects from said arch into engagement with said inner surface of said hollow drive shaft tube.

16. The drive train system defined in claim 13 wherein said arch extends between a pair of supports.

17. The drive train system defined in claim 16 further including a nib that projects from said arch into engagement with said inner surface of said hollow drive shaft tube.

18. The drive train system defined in claim 13 wherein said wiper includes a base having first and second flanges that extend in opposite directions from said base.

19. The drive train system defined in claim 18 further including a winding of corrugated paper that extends about said core and overlaps said first and second flanges.

* * * * *